United States Patent Office 3,635,990
Patented Jan. 18, 1972

3,635,990
4-PIPERIDINO-PROLINES
Francesco A. Mauri, Giancarlo Jommi, and Giovanna Riva, Milan, Italy, assignors to Ravizza S.A., Lausanne, Switzerland
No Drawing. Filed Aug. 4, 1969, Ser. No. 847,426
Int. Cl. C07d 29/28
U.S. Cl. 260—293.71
13 Claims

ABSTRACT OF THE DISCLOSURE 4-piperidino-proline derivatives are disclosed which are endowed with anti-inflammatory, antipyretic and analgesic properties.

The present invention refers to new heterocyclic compounds as well as to the process for their preparation.

More precisely the present invention is concerned with new proline derivatives comprised in the general formula:

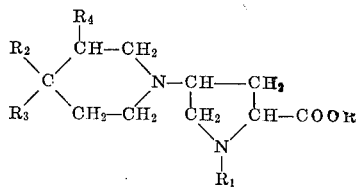

wherein: R may be hydrogen and lower alkyl radical; $R_1$ may be hydrogen, acyl, lower alkoxy- or aralkoxy-carbonyl radical; $R_2$ may be hydrogen, lower alkyl, benzyl, phenyl, hydroxy, carboxy radical; $R_3$ may be hydrogen, hydroxy and phenyl radical provided that it may be hydroxyl only when $R_2$=alkyl or phenyl radical and phenyl radical only when $R_2$=carboxyl; $R_4$ may be hydrogen, lower alkyl, carboxyl or lower-alkoxy-carbonyl, provided that $R_2$ and $R_3$ are different from hydrogen only if $R_4$=hydrogen.

Whenever in what precedes reference is made to a "lower alkyl" radical, it has to be intended that said radical comprises from 1 to 3 carbon atoms.

The new compounds of the invention may exist in a number of stereoisomeric forms all foreseen by the present invention and comprised in the field covered by it. Of course, also the acid addition salts of the compounds of Formula I, with suitable either inorganic or organic acids, are among the objects of the present invention.

The new proline derivatives of Formula I may be prepared according to the process schematically indicated hereinafter, starting from 4-oxo-pyrrolidine derivatives and piperidine or derivatives thereof:

(a)

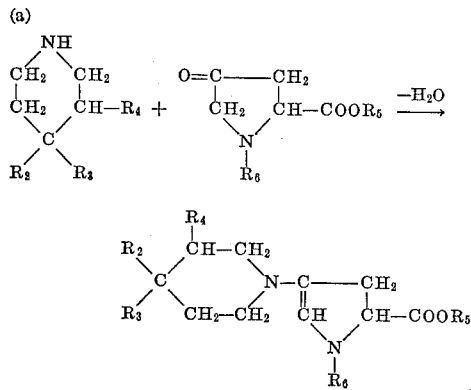

(b)

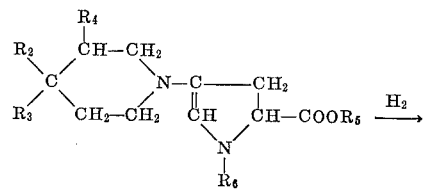

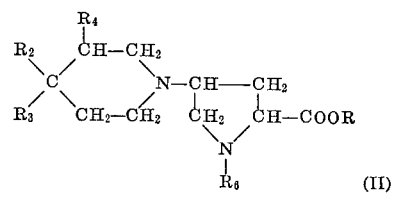

wherein $R_2$, $R_3$, $R_4$ are as above defined and $R_5$ and $R_6$ have respectively the same meanings as R and $R_1$ except that they cannot be hydrogen.

The step (a) condensation reaction is performed by dissolving the two reactants in an aprotic solvent and heating the solution at a temperature between 40° and 150° C., while distilling off the water formed in the reaction possibly as an azeotrope with the reduction solvent. The reaction is preferably carried out in the absence of any catalyst.

The step (b) hydrogenation may be carried out according to one of the known hydrogenation processes, depending on the substituents.

Preferably the hydrogenation is performed with Adams Pt in ethyl alcohol at room temperature and under atmospheric pressure.

When the compounds of Formula I have to be prepared where R=H and $R_1$=$R_6$ (III), the corresponding compounds of Formula II undergo hydrolysis under selective, mild conditions, which only remove the radical $R_5$ while in no way affecting the radical $R_6$. More precisely, the hydrolysis is carried out with diluted aqueous or alcoholic sodium or potassium hydroxide, at room temperature or slightly heating.

When the compounds of Formula I have to be prepared where both R and $R_1$ are hydrogen (IV), the prepared compounds of Formula II are hydrolized under strong conditions, suitable to split the ester- and amido-bonds.

Such conditions are preferably: strong bases, such as $Ba(OH)_2$, in concentrated aqueous solution with which the compounds are refluxed for some hours.

In some cases, for particular values of R and $R_1$ which are difficult to obtain in the starting 4-oxo-pyrrolidine, it has been found convenient to prepare the compounds (III) or (IV) from 4-oxo-pyrrolidines that are easy to obtain, and then to introduce the desired radical into the prepared proline derivative.

For example it is possible to obtain the new proline according to the invention where R=alkyl with 1–3 carbon atoms, by esterification of the corresponding proline of Formula III or IV with an aliphatic alcohol in the presence of a mineral acid.

Likewise it is possible to prepare the compounds where $R_1$ is acyl radical, by acylating the compounds (IV) with a suitable acylating agent such as acyl-halides or acid anhydrides preferably in the presence of equimolecular amounts of strongly basic substances, while the compounds where $R_1$ is alkoxy-carbonyl or aralkoxy-carbonyl are prepared by reacting the compounds (IV) with the desired alkyl- or aralkyl-chlorocarbonate in the presence

3 of equimolecular amounts of inorganic bases such as NaOH and $Na_2CO_3$.

When $R_1$ is acyl radical, it is preferably selected in the group comprising aliphatic acyl radicals with from 2 to 6 carbon atoms and benzoyl, while the meanings alkoxy-carbonyl and aralkoxycarbonyl are preferably selected in the group comprising methoxy-carbonyl, ethoxy-carbonyl, benzyloxy-carbonyl.

The new compounds of the invention are endowed with very good antiinflammatory, antipyretic and analgesic properties, so that there is also comprised in the field of the invention any therapeutic composition comprising at least one compound according to the invention.

EXAMPLE 1

Preparation of the compound 1,2-carboethoxy-4-piperidino-pyrrolidine 10 g. of 1,2-ethoxy carbonyl-4-oxopyrrolidine are dissolved in 100 cc. of anhydrous benzene and added of 8 g. of piperidine. The solution is refluxed for 1 hour. After this time the formed water is distilled off as azeotrope $H_2O$-benzene, while keeping the volume of the solution nearly constant by addition of fresh or recycled benzene. A time in the range of 3–4 hours is necessary to complete the reaction and to completely eliminate the formed water. After this time the solution containing the 1,2-ethoxycarbonyl-4-piperidino-pyrroline is evaporated under reduced pressure up to dryness, the residue is taken up with 50 cc. of ethyl alcohol, added of 800 mg. of $PtO_2$ and hydrogenated.

The solution is filtered through Celite so as to eliminate the catalyst and then the solvent is evaporated. The residue, 11.5 g. of 1,2-ethoxycarbonyl-4-piperidino-pyrrolidine, is an oleous product distilling at 160° C. under a pressure of 0.01 mm. Hg.

EXAMPLE 2

Preparation of the compound 1-carboethoxy-2-carboxy-4-piperidino-pyrrolidine 6 g. of the product obtained in Example 1 are kept under stirring for 30 minutes at room temperature with 25 cc. of N NaOH.

Then the solution is concentrated under reduced pressure and percolated through a column filled with a strongly acid resin; the resin is washed with water and the product is eluted with aqueous 4 N ammonia. The thus obtained solution which contains the 1-ethoxy-carbonyl-2-carboxy-4-piperidino-pyrrolidine, is evaporated up to dryness, under reduced pressure, and the residue is crystallized from a mixture of ethyl alcohol-$H_2O$. 2.2 g. of pure product are obtained.

EXAMPLE 3

Preparation of the compound 4-piperidino-proline 5 g. of 1,2-ethoxy-carbonyl-4-piperidino-pyrrolidine are refluxed with a $Ba(OH)_2$ aqueous solution containing 7 g. of $Ba(OH)_2 \cdot 8H_2O$ in 60 cc. of water, for 15 hours. After cooling, the aqueous solution is added of 7 cc. of 30% $H_2SO_4$, the precipitated $BaSO_4$ is removed by centrifugation and the filtrate is concentrated.

The aqueous solution is percolated through a column filled with a sulphonic resin (Dowex 50X–8) and the resin is washed with water. The product is eluted with 4 N aqueous ammonia and the obtained solution is brought to dryness under reduced pressure. The residue is crystallized from a mixture of methanol-ethanol.

1.8 g. of 2-carboxy-4-piperidino-pyrrolidine are obtained, having the following characteristics: M.W. 198.26; M.P. 245°–246° C.

*Analysis.*—Calculated (percent): C, 60.60; H, 9.09; N, 14.12. Found (percent): C, 60.30; H, 8.90; N, 14.02.

EXAMPLE 4

Preparation of the compound 4-(4-phenyl-piperidino)-proline 0.1 mole of 1,2-carboethoxy-4-piperidino-pyrrolidine are dissolved in 100 cc. of benzene and added of 0.1 mole of 4-phenyl-piperidine. The mixture is refluxed in a Markusson apparatus up to elimination of the theoretical amount of water, which requires a time of nearly two hours. After this time the benzenic solution is evaporated to dryness under reduced pressure, the oleous residue is taken up with 150 cc. of absolute ethyl alcohol, added of 1 g. of Adams $PtO_2$ and hydrogenated up to absorption of 0.1 mole of $H_2$. The catalyst is eliminated by filtration and the solvent evaporated under reduced pressure.

The residue is added of 0.5 mole of $Ba(OH)_2 \cdot 8H_2O$ in 200 cc. of water and is refluxed under stirring up to complete hydrolysis of the ethyl group, which esterifies the carboxylic group in 2-position, and of the carboethoxy group linked to the nitrogen in 1-position. The moment in which the reaction is completed, is determined by testing from time to time some drops of the reacting mixture by means of the thin layer chromatography, with a mixture of $CH_3$—$COOH:C_4H_9OH:H_2O=1:8:1$ as eluent.

At the end of the reaction, the mixture is cooled, acidified with 30% $H_2SO_4$, centrifugated to eliminate the precipitated $BaSO_4$, and the solution is percolated through a column (3 x 40 cm.) filled with a Dowex Resin 50X–8 (50–100 mesh), acid form. It is washed with water and eluted with nearly 750 cc. of 5 N $NH_4OH$. The eluate is evaporated under reduced pressure and the residue, taken up with a mixture of ethyl alcohol:water in the ratio of 8:2, is decolorated with active charcoal and recrystallized from ethyl alcohol.

The obtained 4-(4-phenyl)-piperidino-proline, recrystallized from a mixture of ethyl alcohol-water, shows the following characteristics: M.W.=274.36; M.P.=285° C.

*Analysis.*—Calculated (percent): C, 69.75; H, 8.07; N, 10.21. Found (percent): C, 69.92; H, 8.13; N, 10.25.

Following a method identical to the above described one, also the hereinafter indicated compounds have been prepared:

EXAMPLE 5

4-(3-methyl piperidino)-proline
 M.W.=212.26
 M.P.=255.6° C.

*Analysis.*—Calculated (percent): C, 62.26; H, 9.48; N, 13.20. Found (percent): C, 62.41; H, 9.28; N, 13.10.

(6) 4-(4-methyl-piperidino)-proline
 M.W.=212.26
 M.P.=260–2° C.

*Analysis.*—Calculated (percent): C, 62.26; H, 9.48; N, 13.20. Found (percent): C, 62.36; H, 9.35; N, 13.14.

(7) 4-(4-benzyl-piperidino)-proline
 M.W.=228.38
 M.P.=265° C.

*Analysis.*—Calculated (percent): C, 70.93; H, 8.33; N, 9.76. Found (percent): C, 70.65; H, 8.38; N, 9.68.

(8) 4-(4-hydroxy-piperidino)-proline
 M.W.=214.27
 M.P.=245° C.

*Analysis.*—Calculated (percent): C, 56.35; H, 7.60; N, 13.05. Found (percent): C, 56.55; H, 7.62; N, 13.20.

(9) 4-(4-carboxy-piperidino)-proline
 M.W.=242.27
 M.P.=190–2° C.

*Analysis.*—Calculated (percent): C, 54.55; H, 7.50; N, 11.56. Found (percent): C, 54.32; H, 7.62; N, 11.47.

EXAMPLE 10

Preparation of 1-acetyl-4-piperidino-proline 0.01 mole of 4-piperidino-proline prepared according to the Example 3, are dissolved in 5 cc. of water and added under stirring with 0.02 mole of acetic anhydride. The mixture is kept under stirring for 4 hours, at room temperature, then it is evaporated to dryness, taken up with absolute ethyl alcohol and allowed to crystallize overnight. The crystals, recrystallized from 95° ethyl alcohol, have shown the following characteristics: M.W.=240.30; M.P.=279° C.

*Analysis.*—Calculated (percent): C, 60.00; H, 8.32; N, 11.66. Found (percent): C, 59.80; H, 8.40; N, 11.48.

EXAMPLE 11

Preparation of 1-benzyloxy-carbonyl-4-piperidino-proline 0.01 mole of 4-piperidino-proline are dissolved in 5 cc. of water and added with 0.01 mole of NaOH. 0.01 mole of benzylchloro-carbonate are then added dropwise. After 30 minutes the formed precipitate is filtered and crystallized from 95° ethanol. The product shows the following characteristics: M.W.=332.40; M.P.=243° C.

*Analysis.*—Calculated (percent): C, 65.10; H, 7.22; N, 8.44. Found (percent): C, 65.43; H, 6.89; N, 8.52.

EXAMPLE 12

Preparation of 2-carboethoxy-4-piperidino-pyrrolidine·2HCl 0.01 mole of 4-piperidino-proline are admixed with 10 cc. of anhydrous ethyl alcohol and refluxed under gaseous HCl stream over 4 hours. Then the reaction mixture is cooled, added with anhydrous ethyl ether and crystallized from ethyl alcohol-ethyl ether.

The obtained product shows the following characteristics: M.W.=299.23; M.P.=208° C.

*Analysis.*—Calculated (percent): C, 48.15; H, 8.02; N, 9.36. Found (percent): C, 48.07; H, 8.10; N, 9.35.

As previously said, the new compounds of the invention have been found very useful as antiinflammatory, antipyretic and analgesic products.

The anti-inflammatory activity was evaluated in the rat on oedema produced by carragenine (Winter, A. C. et al.: Proc. Soc. Biol. Med. 1962, 111, 544).

The analgesic activity was evaluated in rats by means of the test Randall-Selitto (Randall, O. L., Selitto R.: Arch. Int. Pharmacodyn, 1957, 111, 409).

The anti-pyretic activity was evaluated in rats made hyperthermic by parenteral administration of yeast. In the following table some significant data have been collected. The figures of the first column indicate the used compound through the numeric reference given in the preparative examples.

The controls (X) have been treated only with the vehicle used for the parenteral administration of the considered compounds.

The effect of the tests on the controls has been put equal to 100.

The remaining rats have been treated with 60 mg./kg. of product suspended in arabic gum.

TABLE I

| | Anti-inflamm. activity | Analgesic activity | | Anti-pyretic activity |
|---|---|---|---|---|
| | | Inflamed tissue | Normal tissue | |
| (X) | 100 | 100 | 100 | 100 |
| (3) | 70 | | | 60 |
| (5) | 95 | 129 | 124 | 65 |
| (6) | 96 | 193 | 144 | 41 |
| (7) | 52 | 119 | 106 | 65 |
| (8) | 68 | | | 90 |

The compounds of this invention may be administered orally or rectally and may be associated with a solid carrier in any of the suitable pharmaceutical forms such as tablets, capsules or suppositories. The new compounds may also be used for injections.

For example a composition suitable to prepare 1000 tablets for oral use, containing 50 mg. of active compound is the following one:

| | G. |
|---|---|
| 4-piperidino-proline | 50 |
| Lactose | 50 |
| Starch | 20 |

The mixture is granulated with 10% gelatine and then added of 10 g. of starch and 3 g. of magnesium stearate.

The tablets are prepared according to the art.

Vials for parenteral injection may be prepared dissolving 29 mg. of active compound in a buffered physiologic solution q.s. ad 2 cc.

What is claimed is:

1. A compound selected from the group of compounds of the formula

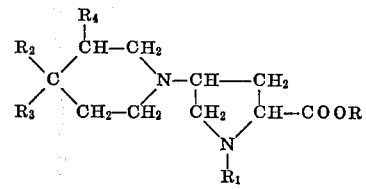

wherein

R is hydrogen or alkyl of 1–3 carbon atoms;

$R_1$ is hydrogen, alkanoyl of 2–6 carbon atoms, lower-alkoxy-carbonyl or benzyl-oxy carbonyl;

$R_2$ is hydrogen, alkyl of 1–3 carbon atoms, benzyl, phenyl, hydroxy or carboxyl;

$R_3$ is hydrogen, phenyl or hydroxy, provided that $R_3$ may be hydroxy only when $R_2$ is alkyl or phenyl, and may be phenyl only when $R_2$ is carboxyl;

$R_4$ is hydrogen or alkyl of 1–3 carbon atoms, provided that $R_2$ and $R_3$ are different from hydrogen only if $R_4$ is hydrogen, and salts thereof.

2. Compound according to claim 1, wherein $$R_2=R_3=R_4=H$$

$R=C_2H_5$, and $R_1=COOC_2H_5$.

3. Compound according to claim 1, wherein $$R_2=R_3=R_4=R=H$$

and $R_1=COOC_2H_5$.

4. Compound according to claim 1, wherein $$R=R_1=R_2=R_3=R_4=H$$

5. Compound according to claim 1, wherein $$R=R_1=R_3=R_4=H$$

and $R_2=-C_6H_5$.

6. Compound according to claim 1, wherein $$R_1=R_2=R_3=H$$

and $R_4=-CH_3$.

7. Compound according to claim 1, wherein $$R=R_1=R_2=R_4=H$$

$R_3=-CH_3$.

8. Compound according to claim 1, wherein $$R=R_1=R_3=R_4=H$$

$R_2=$benzyl.

9. Compound according to claim 1, wherein $$R=R_1=R_3=R_4=H$$

and $R_2=-OH$.

10. Compound according to claim 1, wherein $R=R_1=R_3=R_4=H$ and $R_2=$—COOH.

11. Compound according to claim 1, wherein $R=R_2=R_3=R_4=H$ and $R_1=COCH_3$.

12. Compound according to claim 1, wherein $R=R_2=R_3=R_4=H$ and $R_1=$—COOCH$_2$—C$_6$H$_5$.

13. Compound according to claim 1, wherein $R_1=R_2=R_3=R_4=H$ and $R=$—C$_2$H$_5$.

References Cited
FOREIGN PATENTS
13,742/65    1/1965    Japan _____ 260—326.5

HENRY R. JILES, Primary Examiner
G. T. TODD, Assistant Examiner

U.S. Cl. X.R.
426—267